US007333540B2

(12) United States Patent
Yee

(10) Patent No.: US 7,333,540 B2
(45) Date of Patent: Feb. 19, 2008

(54) EQUALISATION APPARATUS AND METHODS

(75) Inventor: Mong Suan Yee, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 792 days.

(21) Appl. No.: 10/681,300

(22) Filed: Oct. 9, 2003

(65) Prior Publication Data

US 2004/0132416 A1 Jul. 8, 2004

(30) Foreign Application Priority Data

Oct. 15, 2002 (GB) ................................. 0223973.9

(51) Int. Cl.
*H03H 7/30* (2006.01)
(52) U.S. Cl. ..................................... 375/232
(58) Field of Classification Search ........ 375/229–232, 375/345, 130, 316
See application file for complete search history.

(56) References Cited

U.S. PATENT DOCUMENTS

| 6,671,338 | B1 * | 12/2003 | Gamal et al. | ................ | 375/346 |
| 6,993,070 | B1 * | 1/2006 | Berthet et al. | ............... | 375/232 |
| 7,016,440 | B1 * | 3/2006 | Singer et al. | ................ | 375/350 |
| 7,027,497 | B2 * | 4/2006 | Ohmori et al. | ............. | 375/229 |
| 7,027,533 | B2 * | 4/2006 | Abe et al. | .................... | 375/341 |
| 2002/0110188 | A1 * | 8/2002 | Ohmori et al. | ............. | 375/232 |

OTHER PUBLICATIONS

T. Abe, et al., IEEE 54th Vehicular Technology Conference Proceedings, vol. 2 of 4, pp. 1230-1234, XP-001124945, "Space-Time Turbo Equalization and Symbol Detection in Frequency Selevtive Mimo Channels", Oct. 7, 2001.

G. Bauch, et al., IEEE VTS 52ND Vehicular Technology Conference, vol. 4 of 6, pp. 1575-1582, XP-002180247, "Iterative Equalization and Decoding With Channel Shortening Filters for Space-Time Coded Modulation", Sep. 24, 2000.

M. Tüchler, et al., IEEE ISIT 2000, p. 100, XP-010509974, "Iterative Correction of ISI Via Equalization and Decoding With Priors", Jun. 25, 2000.

\* cited by examiner

*Primary Examiner*—Mohammed Ghayour
*Assistant Examiner*—Vineeta Panwalker
(74) *Attorney, Agent, or Firm*—Oblon, Spivak, McClelland, Maier & Neustadt, P.C.

(57) ABSTRACT

The invention relates to apparatus, methods and computer program code for equalisation. A soft-in-soft-out (SISO) equaliser for use in a receiver for receiving data from a transmitter configured to transmit data from a plurality of transmit antennas simultaneously is described. The equaliser comprises at least one received signal input for inputting a received signal; a plurality of likelihood value inputs, one for each transmit antenna, for inputting a plurality of decoded signal likelihood values from a SISO decoder; a processor configured to determine from said plurality of signal likelihood values an estimated mean and covariance value for a signal from each of said transmit antennas; an expected signal determiner coupled to said processor to determine an expected received signal value using said mean values; a subtractor coupled to said received signal input to subtract said expected received signal value from said received signal to provide a compensated signal; a filter coupled to said subtractor to filter said compensated signal to provide a plurality of estimated transmitted signal values, one for each said transmit antenna; a filter coefficient determiner coupled to said processor to determine coefficients of said filter using said covariance values; and an output stage coupled to said filter to output a plurality of transmitted signal likelihood values, one for each said transmit antenna, for input to said SISO decoder.

36 Claims, 6 Drawing Sheets

EQUALISATION APPARATUS AND METHODS

FIELD OF INVENTION

This invention relates to apparatus, methods and computer program code for equalisation in communication systems in which a receiver receives signals from a plurality of transmit antennas, and in particular where the plurality of transmit antennas is associated with a single transmitter.

BACKGROUND OF THE INVENTION

A particular problem arises in a communications links where a transmitter with more than one transmit antenna is employed since signals received from different transmit antennas interfere with one another. This results in so-called multi-stream interference (MSI) and causes decoding difficulties. The potential advantage, however, is greatly increased throughput (that is, a higher bit rate) for such a communications link. In this type of MIMO (Multiple-input Multiple-output) communication link the "input" (to a matrix channel) is provided by the transmitter's plurality of transmit antennas and the "output" (from a matrix channel) is provided by a plurality of receive antennas. Thus each receive antenna receives a combination of signals from all the transmitter's transmit antennas which must be unscrambled.

A typical wireless network comprises a plurality of mobile terminals (MT) each in radio communication with an access point (AP) or base station of the network. The access points are also in communication with a central controller (CC) which in turn may have a link to other networks, for example a fixed Ethernet-type network. Until recently considerable effort was put into designing systems so as to mitigate for the perceived detrimental effects of multipath propagation, especially prevalent in wireless LAN (local area network) and other mobile communications environments. However the described work G. J. Foschini and M. J. Gans, "On limits of wireless communications in a fading environment when using multiple antennas" *Wireless Personal Communications* vol. 6, no. 3, pp. 311-335, 1998 has shown that by utilising multiple antenna architectures at both the transmitter and receiver (a so-called multiple-input multiple-output (MIMO) architecture) vastly increased channel capacities are possible. Attention has also turned to the adoption of space-time coding techniques (in OFDM, space-frequency coding) for wideband channels. Typically channel state information (CSI) for maximum likelihood detection of such coding is acquired via training sequences and the resulting CSI estimates are then fed to a Viterbi decoder.

A technique for space-time code detection in a MIMO system based upon the use of periodic pilot sequences and interpolation filters is described in A. Naguib, V. Tarokh, N Seshadri and A. Calderbank "A space-time coding based model for high data rate wireless communications" IEEE J-SAC vol. 16, pp. 1459-1478. October 1998.

FIG. 1 shows a MIMO communication system 100 in the context of which the technique described in Naguib et al operates. An information source 101 provides an information symbol s(1) at time 1 to a space-time encoder 102 which encodes the symbol as N code symbols $c_1(1)\ c_2(1) \ldots , c_N(1)$), each of which is transmitted simultaneously from one of transmit antennas 104. A plurality M of receive antennas 106 receives respectively signals $r_1(1), \ldots r_M(1)$ which are input to receiver 108. The receiver 108 provides on output 110 an estimate $\hat{s}(1)$ of the encoded transmitted symbol $\hat{s}(1)$. There is a plurality of channels between the transmit and receive antennas, for example all channels with two transmit antennas and two receive antennas. The technique described in Naguib et al uses periodic pilot sequences in the transmitted signal to estimate the time varying responses of these channels.

Third generation mobile phone networks use CDMA (Code Division Multiple Access) spread spectrum signals for communicating across the radio interface between a mobile station and a base station. These 3G networks are encompassed by the International Mobile Telecommunications IMT-2000 standard (www.ituint). Collectively the radio access portion of a 3G network is referred to as UTRAN (Universal Terrestrial Radio Access Network) and a network comprising UTRAN access networks is known as a UMTS (Universal Mobile Telecommunications System) network. The UMTS system is the subject of standards produced by the Third Generation Partnership Project (3GPP, 3GPP2), technical specifications for which can be found at www.3gpp.org. Fourth generation mobile phone networks, although not yet defined, may employ MIMO-based techniques.

In practical data communication systems multipath within a channel results in intersymbol interference (ISI), which is often corrected with a combination of equalisation and forward error coding. For example a linear equaliser effectively convolves the received data with an inverse of the channel impulse response to produce data estimates with ISI substantially removed. An optimal equaliser may employ maximum likelihood (ML) sequence estimation or maximum a priori estimation (MAP), for example using a Viterbi algorithm. Where data has been protected with a convolutional code a soft input Viterbi decoder may be employed, usually together with data interleaving to reduce the effects of burst errors. Such approaches provide optimal equalisation but become impractical as the symbol alphabet size and sequence length (or equivalently channel impulse response length) increases.

Turbo equalisation achieves results which are close to optimal but with substantially reduced complexity compared to non-iterative joint channel equalisation and decoding. Broadly speaking turbo equalisation refers to an iterative process in which soft (likelihood) information is exchanged between an equaliser and a decoder until a consensus is reached. The effect of the channel response on the data symbols is treated similarly to an error correction code and typically a soft output Viterbi algorithm (SOVA) is used for both. Again, however, such techniques are impractically complex for large delay spreads and symbol alphabets, particularly as several processing iterations may be needed to achieve convergence for a single data block. These difficulties are significantly exacerbated where signals from more than one transmit antenna must be disentangled and equalised, with a different channel response for each transmit antenna or transmit-receive antenna pair.

A paper by Tuchler et al. (Minimum Mean Squared Error Equalization Using A-priori Information, Michael Tuchler, Andrew Singer, Ralf Koetter, IEEE Transactions on Signal Processing, vol. 50, pp. 673-683, March 2002) describes a simplified approach to turbo-equalisation where a single transmit antenna is employed. In this paper the conventional MAP equaliser is replaced by a linear equaliser (that is by a linear or transversal filter) with filter coefficients which are updated using a minimum mean square error (MMSE) criterion evaluated over both the distribution of noise and the distribution of symbols. A linear estimate $\hat{x}_n$ of a transmitted symbol $x_n$ is determined using an observation $z_n$ via the equation $\hat{x}_n = a_n^H z_n + b_n$ where superscript $^H$ denotes the Hermitian operator and $a_n$ and $b_n$ are the coefficients of the estimator (strictly the estimate should be termed affine rather than linear because of the constant $b_n$). The coefficients are chosen to minimise the MSE cost $E(|x_n - \hat{x}_n|^2)$ where $E(\bullet)$ denotes a mean or expectation value. As information is fed back to the equaliser from the error correction decoder the filter coefficients change with time and are thus recomputed for each data symbol to be estimated. A related technique is described in WO 02/15459.

The contents of the Tuchler et al. paper are helpful for understanding the present invention, which builds upon and extends this work and, in particular, sections II and III of this paper are specifically hereby incorporated by reference.

Another paper, Tetsushi Abe and Tad Matsumoto, "Space-Time Turbo Equalization and Symbol Detection in Frequency Selective MIMO Channels" in: Proc. Veh. Techn. Conference, IEEE VTS $5^{th}$. Vol. 2. pg 1230-1234, 2001 describes the application of turbo equalisation to a MIMO system with a plurality of users (transmitters). However the simplified approach described in this paper is only suitable for BPSK and not for other (higher) modulation schemes used, for example, by wireless LAN networks. Therefore improved techniques, and in particular improved algorithms for systems with multiple antenna transmitters are still desirable.

Other background prior art may be found in US 2002/0110188 which also employs adaptive linear filtering in SISO (soft-in soft-out) turbo equalisation, in Iterative (Turbo) Soft Interference Cancellation and Decoding for Coded CDMA, Xiaodong Wang, H. Vincent Poor, IEEE Trans. Comms. Vol 47, No. 7, July 1999, pp. 1046-1061, and in Iterative Receivers for Multiuser Space-Time Coding Systems, Ben Lu and Xiaodong Wang, IEEE Journal On Selected Areas in Communications, Vol. 18 No. 11, November 2000. pp. 2322-2335. In these documents the references to "soft" information are to information relating to the likelihood of a particular bit, symbol or signal value as opposed to, for example, hard information resulting from a hard bit decision defining a bit as a logic one or zero. More complex trellis-based and Bayesian-based SISO equaliser components have also been utilized for iterative turbo-equalization where the equalizer and decoder iteratively exchange transmitted symbol likelihood information to improve the bit-error-rate of the receiver.

Filter-based equalisers using MMSE or zero-forcing criteria, Bayesian-based equalisers and trellis-based equalisers such as (MAP) and Maximum Likelihood Sequence Estimation (MLSE) equalisers have all been employed for wideband MIMO systems to mitigate both ISI and MSI. It is also known to use iterative turbo equalization technology for equalisation in MIMO systems. However turbo equalisers employing trellis or Bayesian-based SISO equalisation have a high computational complexity, and this increases exponentially with the length of channel response and the number of possible states/levels of the modulation employed. The simplified turbo equalisation schemes described in Tuchler et al., WO 02/15459 and US 2002/0110188 consider systems with a plurality of receive antennas but are incapable of equalisation in systems with more than one transmit antenna. It will be appreciated that with multiple receive antennas and a single transmit antenna each receive antenna is associated with a single channel whereas the situation is much more complex with multiple transmit antennas since a combination of signals from different transmit antennas is received.

There is therefore a need for a reduced computational complexity turbo equalization scheme suitable for mitigating both MSI and ISI in a MIMO communications system.

SUMMARY OF THE INVENTION

According to a first aspect of the invention there is therefore provided a soft-in-soft-out (SISO) equaliser for use in a receiver of a communications system employing a plurality of transmit antennas, the equaliser comprising: at least one received signal input for inputting a received signal; a plurality of likelihood value inputs, one for each transmit antenna, for inputting a plurality of decoded signal likelihood values from a SISO decoder; a processor configured to determine from said plurality of signal likelihood values an estimated mean and covariance value for a signal from each of said transmit antennas; an expected signal determiner coupled to said processor to determine an expected received signal value using said mean values; a subtractor coupled to said received signal input to subtract said expected received signal value from said received signal to provide a compensated signal; a filter coupled to said subtractor to filter said compensated signal to provide a plurality of estimated transmitted signal values, one for each said transmit antenna; a filter coefficient determiner coupled to said processor to determine coefficients of said filter using said covariance values; and an output stage coupled to said filter to output a plurality of transmitted signal likelihood values, one for each said transmit antenna, for input to said SISO decoder.

The equaliser may be used in a receiver of a MIMO communications system in which case a plurality of received signal inputs is provided and a MIMO filter is employed. Broadly speaking use of a multiple output or MIMO linear (affine) or transversal filter provides a computational complexity which in embodiments increases only linearly with increasing channel impulse response (CIR) length and size of signal constellation. With the aid of soft information from the decoder both ISI from the dispersive channels and MSI from the signals from the multiple transmit antennas may be jointly mitigated (in embodiments of the invention some residual ISI may be present at the equaliser outputs but MSI may be substantially removed). Embodiments of the invention thus are able to provide a low computational complexity iterative turbo equalisation solution for MIMO systems where conventional techniques are impractical. Embodiments of the equaliser are particularly useful for relatively highly dispersive channels. Any suitable conventional decoder may be employed with the equaliser including, but not limited to, convolutional, block, turbo, low density parity check or space-time trellis decoders, or a serially or parallel concatenation of these, depending upon the encoder used at the transmitter.

In embodiments the expected received signal value comprises an ISI (and/or MSI) component of the received signal, for example derived by applying a channel response (H) to an expected or estimated transmitted signal (E(X)). Preferably the expected received signal value is adjusted by an amount dependent upon expected values of estimated transmitted signal values derived from the signal likelihood values from the SISO decoder, for example expected symbol interference values. For an n-th transmitted symbol interference to the signal $x_n^i$ from the i-th transmit antenna may be determined as described later from $e^i E(x_n^i)$ where $e^i$ is the i-th column of a symbol interference matrix S.

Preferably the filter coefficients are determined according to a mean square error cost function, in particular a MMSE function and a filter gain controller is provided to control the gain of the filter dependent upon covariance values of estimated transmitted signal values, as derived from the ' signal likelihood values. Again the mathematical basis of this is described later.

To further reduce the computational complexity the filter coefficients may be held constant over a packet or block of received symbols rather than recomputed each symbol. Similarly the filter coefficients may be computed in the frequency rather than in the time domain, for example in a single-carrier modulation system by transforming a packet or block of received symbols to the frequency domain for processing in parallel and then afterwards transforming back into the time domain. Alternatively, in an OFDM (Orthogonal Frequency Division Multiplexed) system, where the symbols are in the frequency domain, a transformation such as an IFFT (inverse Fast Fourier Transform) is not necessary after frequency-domain equalisation.

A receiver may be provided incorporating both the equaliser and the decoder and preferably, to improve the independence of the transmitted data, also a deinterleaver following the equaliser and an interleaver to interleave the likelihood value inputs to the equaliser from the decoder. Such a receiver may be incorporated in, for example, a mobile terminal, base station or access point of a communications system with more than one transmit antenna, for example for increased data rates and/or, where transmit diversity is employed, for increased robustness.

According to another aspect of the invention there is provided a method of equalising received data in a communications system employing a receiver with at least one receive antenna and a transmitter with a plurality of transmit antennas, the method comprising: inputting at least one received signal from said at least one receive antenna; inputting a plurality of decoded signal likelihood values, one for each transmit antenna, from a SISO decoder; determining from said plurality of signal likelihood values an estimated mean and covariance value for a signal from each of said transmit antennas; determining an expected received signal value using said mean values; subtracting said expected received signal value from said received signal to provide a compensated signal; determining coefficients for a filter using said covariance values; filtering said compensated signal in accordance with said coefficients to provide a plurality of estimated transmitted signal values, one for each said transmit antenna; and outputting a plurality of transmitted'signal likelihood values, one for each said transmit antenna, derived from said estimated transmitted signal values, for input to said SISO decoder.

According to a further aspect of the invention there is provided a SISO MIMO turbo-equaliser configured for use with a SISO decoder to equalise data from a multiple antenna transmitter, the equaliser comprising a multi-dimensional transversal filter having a plurality of soft inputs and providing a plurality of soft outputs, the equaliser being configured to receive soft information from said SISO decoder and to use said soft information to adjust coefficients of said transversal filter to mitigate MSI and ISI.

In another aspect the invention provides a method of turbo-equalising data in a receiver receiving data from a transmitter configured to transmit data from a plurality of transmit antennas simultaneously, the receiver including a SISO decoder, the method comprising: inputting a received signal vector comprising a block of received signal data including data received from said plurality of transmit antennas; receiving soft decoded information from said decoder; processing said received data using a linear filter having a plurality of soft inputs derived from said received signal vector to provide a plurality of soft equaliser outputs, one for each transmit antenna, to said SISO decoder; and adjusting coefficients of said linear filter in response to said soft decoded information to mitigate MSI and ISI.

The invention also provides a method of equalising data in a receiver of a communications system with a plurality $n_I$ of transmit antennas the method comprising: inputting a received signal vector $Z_n$ comprising a block of received signal data at an index n; inputting from a SISO decoder a set of bit likelihood values $L(c_{n,j}{}^i)$, i=1 to $n_I$, j=1 to m where $c_{n,j}{}^i$, denotes a portion of an m-bit codeword symbol at an index n; determining expectation $E(x_n{}^i)$ and covariance $cov(x_n{}^i, x_n{}^i)$ values for estimated transmitted signal values $x^{\prime i}$ using the values $L(c_{n,j}{}^i)$, where $x_n{}^i$ denotes an estimated value of a signal transmitted from a transmit antenna i at an index n; determining an updated estimated transmitted signal value $\hat{x}_n{}^i$ at index n for each transmit antenna i using $\hat{x}_n{}^i = K_n{}^i f_n{}^i{}^H [Z_n - (E(Z_n) - e^i E(x_n{}^i))]$ where $E(Z_n) = HE(X_n)$ and H is a channel impulse response matrix and $E(X_n)$ is an expectation value of an estimated transmitted signal vector $X_n$ at index n derived from values $E(x_n{}^i)$, where $e^i$ is the ith column of a matrix S and $S = H[0_{n_I \times (N2+L-1)n_I} I_{n_I \times n_I} 0_{n_I \times N1 n_I}]^H$ where matrix $I_{i \times i}$ is an i×i identity matrix and $0_{i \times j}$ is a matrix in which each element is substantially zero, $f_n{}^i$ is the ith column of a filter matrix $F_n$ and $F_n$ is derived from $cov(x_n, x_n)$, and where $K_n{}^i$ is a scalar filter gain; and outputting equalised likelihood values $L_e(c_{n,j}{}^i)$ derived from values $\hat{x}_n{}^i$.

The transmitted symbol index n may index time and/or frequency, depending upon the modulation scheme employed.

The skilled person will recognise that the above-described equalisers and methods may be implemented using and/or embodied in processor control code. Thus in a further aspect the invention provides such code, for example on a carrier medium such as a disk, CD- or DVD-ROM, programmed memory such as read-only memory (Firmware) or on a data carrier such as an optical or electrical signal carrier. Embodiments of the invention may be implemented on a DSP (Digital Signal Processor), ASIC (Application Specific Integrated Circuit) or FPGA (Field Programmable Gate Array). Thus the code may comprise conventional program code, or micro-code, or, for example, code for setting up or controlling an ASIC or FPGA. In some embodiments the code may comprise code for a hardware description language such as Verilog (Trade Mark) or VHDL (Very high speed integrated circuit Hardware Description Language). As the skilled person will appreciate, processor control code for embodiments of the invention may be distributed between a plurality of coupled components in communication with one another.

BRIEF DESCRIPTION OF THE DRAWINGS

These and other aspects of the invention will now be further described, by way of example only, with reference to the accompanying figures in which.

DETAILED DESCRIPTION

Figure 1:
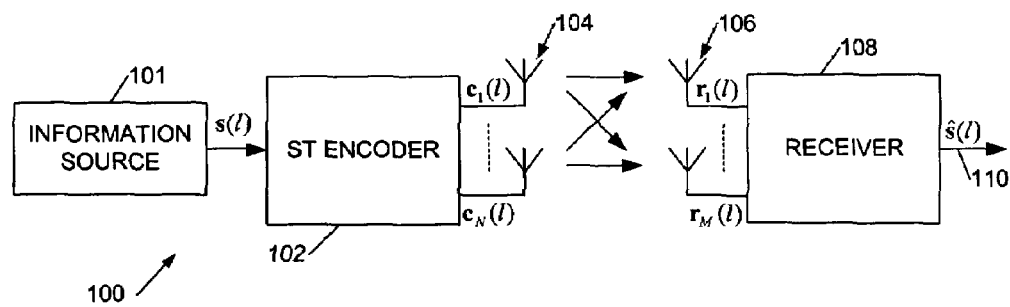
FIG. 1 shows a known MIMO space-time coded communications system.
Figure 2:
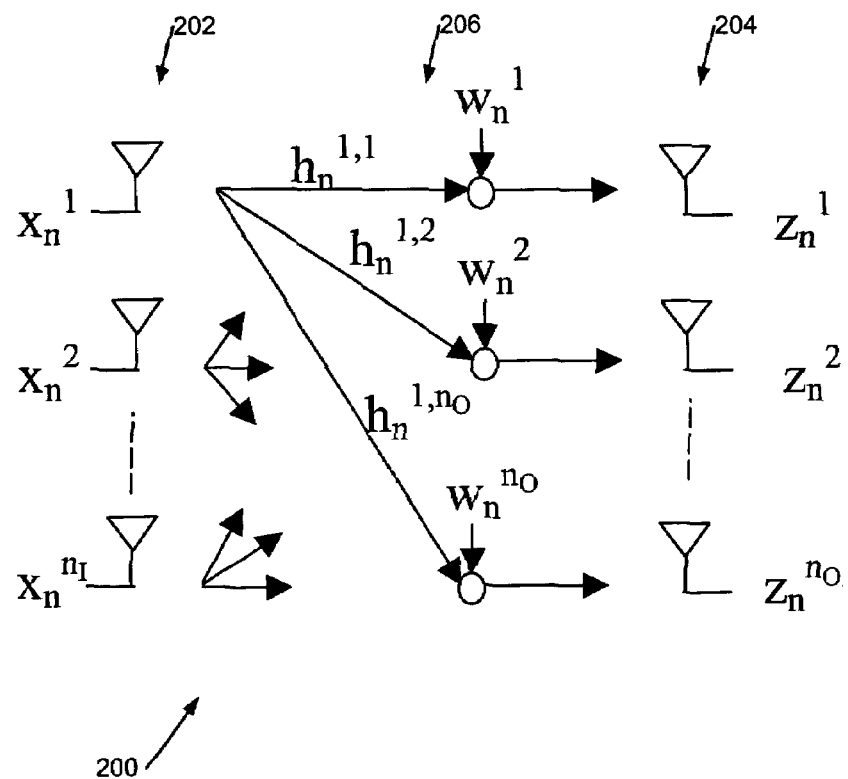
FIG. 2 shows a block diagram of a MIMO channel model.

Referring to FIG. 2, this shows a block diagram 200 of a MIMO channel model. A multi-stream transmitter has first plurality $n_I$ of transmit antennas 202 and transmits respective symbols $x_n^1, x_n^2, \ldots, x_n^{n_I}$ at time n which comprise "inputs" to a matrix channel 206. A plurality $n_O$ of receive antennas 204 provides "outputs" from the $n_I \times n_O$ MIMO matrix channel in the form of received signals $z_n^1, z_n^2, \ldots, z_n^{n_O}$. There is a channel with an associated channel response $h_n^{i,j}$ between the ith transmit antenna and jth receive antenna. The received signal at each receive antenna also includes a noise component $w_n^j$.

In an $n_I \times n_O$ MIMO system the MIMO equalizer aims to provide an estimate of $n_I$ transmitted data symbols at every signalling instant. Data from the plurality of transmit antennas are transmitted at the same or overlapping times and using at the same or overlapping frequencies and thus MSI is introduced, as well as ISI from the dispersive wideband channel. In some systems the same or related data is transmitted from different transmit antennas in order to provide redundancy or diversity. In other systems different data streams are transmitted from each transmit antenna, for example to provide higher overall data rates.

Broadly speaking, in embodiments of the invention a turbo equalizer is in the form of a multi-dimensional transversal filter. Coefficients of the filter are adjusted according to a Minimum Mean Square Error (MMSE) criterion to mitigate the effects of both Inter-Symbol Interference (ISI) and Multi-Stream Interference (MSI) and provide a soft output, with the aid of soft information relating to multiple transmitted data signals received from a decoder. The equalizer processes signals from all the transmit antennas in parallel (although potentially in a time-multiplexed manner in processor-based embodiments) is thus able to "detect" and equalise a multistream signal. The soft or likelihood information from the decoder is used to determine the covariance and mean of the multistream transmitted signal for evaluating the coefficients of the equalizer and also to determine a mean or expected value of the received signal for MMSE based detection.

In embodiments the SISO equalization may be performed in either or both of the time and frequency domains. Initially a time-domain implementation will be described; details of an alternative frequency-domain implementation will be given later.

The elements of the equalizer will generally be implemented by a digital signal processor and the structure and operation of a first, time-domain embodiment of the equalizer will therefore first be described in mathematical terms.

Consider first a signal transmission model for a linear, dispersive and noisy communication system with $n_I$ inputs and $n_O$ outputs (that is a $n_I \times n_O$ MIMO system). The complex-valued baseband equivalent signal model can be represented as by equation (1) below:

$$z_n = \sum_{k=0}^{L-1} h_k x_{n-k} + w_n \qquad (1)$$

where L is the channel length in symbol periods, where $z^n = [z_n^1 \; z_n^2 \ldots z_n^{n_O}]^T$ is the signal received by the $n_O$ receive antennas, where $w_n = [w_n^1 \; w_n^2 \ldots w_n^{n_O}]^T$ is the noise component, where $x_n = [x_n^1 \; x_n^2 \ldots x_n^{n_I}]^T$ is signal transmitted by the $n_I$ transmit antennas, and where n labels a symbol (ie. in this case corresponds to time in symbol periods). The dispersive channel matrix is denoted by:

$$h_k = \begin{bmatrix} h_k^{1,1} & h_k^{2,1} & \cdots & h_k^{n_I,1} \\ h_k^{1,2} & h_k^{2,2} & \cdots & h_k^{n_I,2} \\ \vdots & \vdots & \ddots & \vdots \\ h_k^{1,n_O} & h_k^{2,n_O} & \cdots & h_k^{n_I,n_O} \end{bmatrix}.$$

Here, $h_k^{i,j}$ represents the kth channel tap for a channel link between an ith transmit antenna and a jth receive antenna as shown in FIG. 2.

Consider an embodiment of a transversal filter based equaliser with (integer) N coefficients or taps where $N = N1 + N2 + 1$ (N1 and N2 in effect specifying the length of the causal and non-causal portions of the filter). The filter employs an observation of a block of received signal of length N in symbol periods, which is denoted as:

$$Z_n = HX_n + W_n \qquad (2)$$

where $$Z_n = [z_{n-N2}^T \ldots z_n^T \ldots z_{n+N1}^T]^T \qquad (3)$$

is the $Nn_O \times 1$ received signal vector, $$W_n = [w_{n-N2}^T \ldots w_n^T \ldots w_{n+N1}^T]^T \qquad (4)$$

is the $Nn_O \times 1$ received noise vector, $$X_n = [x_{n-N2-L+1}^T \ldots x_n^T \ldots x_{n+N1}^T]^T \qquad (5)$$

is the $(N+L-1)n_I \times 1$ transmit signal vector which convolves with the $Nn_O \times (N+L-1)n_I$ channel impulse response (CIR) matrix H given by:

$$H = \begin{bmatrix} h_{L-1} & h_{L-2} & \cdots & h_0 & 0_{n_O \times n_I} & \cdots \\ 0_{n_O \times n_I} & h_{L-1} & h_{L-2} & \cdots & h_0 & \cdots \\ \ddots & \vdots & \vdots & \ddots & \ddots & \ddots \\ \cdots & 0_{n_O \times n_I} & h_{L-1} & h_{L-2} & \cdots & h_0 \end{bmatrix} \qquad (6)$$

Determination of the filter coefficients and of a soft transmitted symbol estimate by the equaliser will next be considered.

An optimum linear estimate of the transmitted symbols $\hat{x}_n = [\hat{x}_n^1 \; \hat{x}_n^2 \ldots \hat{x}_n^{n_I}]^T$ upon receiving $Z_n$, based on the second-order statistics (that is, means and covariances) has the form given in equation (7) below (see, for example, "An Introduction to Signal Detection and Estimation", H. Vincent Poor, Second Edition, Springer, ISBN0-387-94173-8 at pages 221 to 233):

$$\hat{x}_n = E(x_n) + A_n^H [Z_n - E(Z_n)] \quad (7)$$

where, as before, E(·) denotes a mean or expectation value and $A_n$ is the set of N linear filter/equalizer coefficients at symbol (time) n. It can be seen from equation (7) that the estimate of the transmitted symbol $\hat{x}_n$ is the mean offset of the filtered difference between the received signal vector $Z_n$ and the ISI and MSI component $E(Z_n)$ at time n.

Minimizing the mean square error cost function $E(|x_n - \hat{x}_n|^2)$, an optimum set of filter coefficients $A_n$ is given by:

$$A_n = \text{cov}(Z_n, Z_n)^{-1} \text{cov}(Z_n, x_n) \quad (8)$$

where the covariance operator $\text{cov}(x,y) = E(xy^H) - E(x)E(y^H)$. Equation (7) can be expressed in the form:

$$\hat{x}_n = E(x_n) + \text{cov}(x_n, x_n) F_n^H [Z_n - E(Z_n)] \quad (9)$$

where the expectation value of the received signal observed at the equalizer taps, in terms of the transmitted signal or an estimate of this signal, is given by:

$$E(Z_n) = HE(X_n) \quad (9a)$$

As will be seen later, $E(Z_n)$ may be determined from the soft decoder output. In equation (9) the $Nn_O \times n_I$ filter matrix $F_n$ is defined as $$F_n = R_{ZZ}^{-1} S \quad (10)$$
$$= [R_{WW} + HR_{XX}H^H]^{-1}S$$

where the covariances are defined as $R_{ZZ} = \text{cov}(Z_n, Z_n)$, $R_{XX} = \text{cov}(X_n, X_n)$, $R_{WW} = \text{cov}(W_n, W_n)$.

The $Nn_O \times n_I$ CIR matrix S introducing the symbol interference from the n-th transmitted symbols is given by:

$$S = H[0_{n_P \times (N2+L-1)n_I} I_{n_P \times n_I} 0_{n_P \times N1 n_I}]^H \quad (11)$$

In equation (11) matrix $I_{i \times i}$ is an i×i identity matrix and matrix $0_{i \times j}$ contains all zeros.

It can be understood from the form of the equalizer (filter) coefficient matrix $F_n$ expressed in equation (10), which includes the channel matrix H as defined in equation (6), that the equalizer not only performs equalization on the ISI but also mitigates MSI.

The mean and covariance of the transmitted signal, $E(x_n)$ and $\text{cov}(x_n, x_n)$, which are used to compute the filter coefficients and the estimated transmitted signal, may be obtained using equations (16) and (17) below. The block-diagonal covariance matrix $R_{XX}$ comprises (N+L−1) block-diagonal blocks of $\text{cov}(x_n, x_n)$ as follows:

$$R_{XX} = \begin{bmatrix} \text{cov}(x_{n-N2-L+1}, x_{n-N2-L+1}) & & \\ & \ddots & \\ & & \text{cov}(x_{n+N1}, x_{n+N1}) \end{bmatrix}$$

The CIR matrix H may be obtained from a MIMO channel estimation block in the receiver in a conventional manner. Thus in one embodiment known pilot or training sequences are periodically inserted into the signal from each transmit antenna and at the receiver these known sequences are encoded and provided to a channel estimator together with one (or more) input signal streams from the one (or more) receive antennas. Providing the training sequences in the signal streams have a low cross-correlation coefficient the channel estimator is then able to determine the CIR matrix H by, in effect, correlating the encoded known data sequence for each stream with the actual received data. An example of such a channel estimator is described in Ye Geoffrey Li, "Simplified channel estimation for OFDM systems with multiple transmit antennas", IEEE Transactions on Wireless Communications, Vol. 1, No. 1, pg. 67, January 2002, which is hereby incorporated by reference.

Advantageously the channel estimation may also be performed iteratively by using the estimated transmitted symbols $\hat{x}_n^i$ as additional training symbols. For background information relating to this reference may be made to Tetsushi Abe and Tad Matsumoto, "Space-Time Turbo Equalization and Symbol Detection in Frequency Selective MIMO Channels" in: Proc. Veh. Techn. Conference, IEEE VTS $5^{th}$, Vol. 2. pg 1230-1234, 2001, also hereby incorporated by reference. Thus, for example, multiple, deinterleaved outputs from the decoder (one for each transmit antenna) may be re-encoded and provided to the channel estimator similarly to a known training sequence. In this way, an updated estimated value of H may be obtained on every turbo equalization iteration and this may in turn be used to compute the equalizer coefficients.

For good convergence behaviour the soft transmitted symbol information $\hat{x}_n^i$ provided by the equalizer should be independent from the soft transmitted symbol information from the decoder in the iterative structure. At the transmitter a sequence of m bits, where m is the number of bits per symbol, is encoded as a codeword $c_{n,j}^i \in \{+1,-1\}$, $j=1, \ldots,$ m for transmit antenna i. The decoder provides soft log likelihood ratio information $L(c_{n,j}^i)$, $j=1, \ldots,$ m where $L(c_{n,j}^i) = \ln\{P(c_{n,j}^i = +1)/P(c_{n,j}^i = -1)\}$ which, from the point of view of the equaliser, may be considered as a priori information. To provide good convergence behaviour the likelihood information for bits $c_{n,j}^i$, $j=1, \ldots,$ m (corresponding to symbol $x_n^i$) which are available to the equalizer is set to $L(c_{n,j}^i)^{Equalizer} = 0$, $j=1, \ldots,$ m to derive an equation for $\hat{x}_n^i$. (During the turbo equalisation these values may also be initialised to zero). Then, eliminating the dependence of the equalisation on $L(c_{n,j}^i)$, $j=1, \ldots,$ m provided by the decoder, and setting the expectation $E(x_n^i)^{Equalizer} = 0$ and the covariance $\text{cov}(x_n^i, x_n^i)^{Equalizer} = \delta_{x,i}^2$, where $\delta_{x,i}^2$ is an initial value, for example unity (depending upon the relative gain of the transmit antennas), for the signal variance of transmitted symbols from transmit antenna i, the i th component of the estimated transmitted symbol $\hat{x}_n$ in equation (9) can be expressed as scaled version of $F_n$ (using the matrix inversion lemma), as shown in equation (12) below:

$$\hat{x}_n^i = K_n^i f_n^{iH} [Z_n - (E(Z_n) - e^i E(x_n^i))] \quad (12)$$

where the filter gain $K_n^i$ is given by:

$$K_n^i = (1 + (\delta_{x,i}^2 - \text{cov}(x_n^i, x_n^i)) f_n^{iH} e^i)^{-1} \quad (13)$$

In equations (12) and (13) $f_n^i$ is the ith column of the filter matrix $F_n$ defined in equation (10) and $e^i$ is the i th column of the symbol interference matrix S given in equation (11).

Next a reduced complexity method of determining $R_{ZZ}^{-1}$ is described, for computing the filter matrix $F_n$ via equation (10). In order to avoid performing a direct matrix inversion of the $Nn_O \times Nn_O$ covariance matrix $R_{ZZ}$ to compute the filter matrix $F_n$ for every estimate of symbols $\hat{x}_n$, a time-recursive update algorithm may be employed. The algorithm is similar to one described in the Tuchler et al. paper (ibid) and exploits the existence of common submatrices within a partitioned covariance matrix. The matrix $R_{ZZ}^{-1}$ at a time n+1 may be determined by the manipulation of submatrices as set out in equation (14):

$$R_{ZZ}^{-1}(n+1) = \begin{bmatrix} U_N & \bar{u}_N \\ u_N^H & u_N \end{bmatrix} \quad (14)$$

These submatrices may in turn be determined based upon a previous $R_{ZZ}^{-1}$ at a time n, as shown by equations (15) below:

$$R_{ZZ}^{-1}(n) = \begin{bmatrix} u_P & \bar{u}_P^H \\ \bar{u}_P & U_P \end{bmatrix} \quad (15)$$

$$U_N = \sum_P^{-1} + \varpi_N u_N^H \varpi_N^H$$

$$\bar{u}_N = -\varpi_N u_N$$

$$u_N = [\sigma_N - \omega_N^H \varpi_N]^{-1}$$

$$\varpi_N = \sum_P^{-1} \omega_N$$

$$\begin{bmatrix} \omega_N \\ \sigma_N \end{bmatrix} = [R_{WW} + HR_{XX}H^H] \cdot \begin{bmatrix} 0_{(N-1)n_O \times n_O} \\ I_{n_O \times n_O} \end{bmatrix}$$

$$\sum_P^{-1} = U_P - \bar{u}_P u_P^{-1} \bar{u}_P^H$$

The sizes of the matrices $\omega_N$, $\sigma_N$, $u_p$, $\bar{u}_p$, $U_p$ are (N−1)$n_O \times n_O$, $n_O \times n_O$, $n_O \times n_O$, (N−1)$n_O \times n_O$ and (N−1)$n_O \times$(N−1)$n_O$, respectively. It can therefore be seen that only the matrix inversion of $n_O \times n_O$ matrices $u_P$ and $(\sigma_N - \omega_N^H \bar{\omega}_N)$ is required to update the matrix $R_{ZZ}^{-1}$. The term $R_{WW}$ is the noise covariance and a value for this may be determined, for example, theoretically from the receiver bandwidth (particularly where the front end filter has a relatively sharp cut-off; see also 3GPP TS25.215 v5.2.1 for background on received power), or by a measurement of the level of noise (and/or interference) at the receiver, or by a combination of both these techniques. Where the noise levels at the receive antennas are similar $R_{WW}$ may approximate to a fraction of I.

The soft (likelihood) value inputs to the equaliser from the decoder will now be discussed.

The soft information provided by the decoder in terms of the likelihood values are utilized to provide the mean $E(x_n^i)$ and covariance $cov(x_n^i, x_n^i)$ of the transmitted symbols, which are required to compute $x_n^i$ in Equation (9). The mean and covariance values are obtained as shown below:

$$E(x_n^j) = \sum_{\alpha_k \in S} \alpha_k P(x_n^j = \alpha_k) \quad (16)$$

and $$cov(x_n^i, x_n^i) = \left( \sum_{\alpha_k \in S} |\alpha_k|^2 P(x_n^i = \alpha_k) \right) - |E(x_n^i)|^2 \quad (17)$$

At the transmitter a sequence of m bits c is mapped to a symbol x selected from a Q=$2^m$-ary symbol alphabet S={$\alpha_1$, $\alpha_2$, ..., $\alpha_Q$} in which each symbol $\alpha_k$ corresponds to an m bit pattern $s_k=\lfloor s_{k,1} s_{k,2} ... s_{k,m}\rfloor$, $s_{k,j} \in \{+1,-1\}$. The probabilities of the transmitted symbols are given by:

$$P(x_n^i = \alpha_k) = \prod_{j=1}^m P(c_{n,j}^i = s_{k,j}) \quad (18)$$

$$= \prod_{j=1}^m 1/2 \cdot \{1 + s_{k,j} \tanh(L(c_{n,j}^i)/2)\}$$

$$i = 1, \cdots, n_I, k = 1, \cdots, Q$$

The soft (likelihood) value outputs from the equaliser to the decoder will next be considered.

At the output of the equalizer, it is assumed the probability density functions of the estimated symbols $p(x_n^i | c_n^i = s_k)$ are Gaussian with mean $\mu_{n,k}^i$ and variance $\sigma_{n,k}^{2i}$. The log-likelihood ratios of the bits contained in the transmitted symbols are then given by:

$$L_e(c_{n,j}^i) = \ln\left( \sum_{\forall s_k : s_{k,j} = +1} \exp\left( \frac{-|E(\hat{x}_n^i - \mu_{n,k}^i)|^2}{\sigma_{n,k}^{2i}} + \phi_{n,j}^i \right) \right) - \quad (19)$$

$$\ln\left( \sum_{\forall s_k : s_{k,j} = -1} \exp\left( \frac{-|E(\hat{x}_n^i - \mu_{n,k}^i)|^2}{\sigma_{n,k}^{2i}} + \phi_{n,j}^i \right) \right)$$

$$\phi_{n,j}^i = \sum_{\forall j' : j' \neq j} s_{k,j'} L(c_{n,j'}^i)/2$$

Based on the derivation obtained for the estimate of the transmitted symbol $x_n^i$ equation (12) the mean and variance of the equaliser output may then be written:

$$\mu_{n,k}^i = K_n^i f_n^{iH} [E(Z_n | x_n^i = \alpha_k) - (E(Z_n) - e^i E(x_n^i))] \quad (20)$$

$$= K_n^i \alpha_k f_n^{iH} e^i$$

and $$\sigma_{n,k}^{2i} = K_n^{i2} f_n^{iH} cov(Z_n, Z_n | x_n^i = \alpha_k) f_n^i \quad (21)$$

$$= K_n^{i2} (f_n^{iH} R_{zz} f_n^i - cov(x_n^i, x_n^i) f_n^{iH} e_n^i e_n^{iH} f_n^i)$$

The logarithmic summation of exponentials used in equation (19) to compute the equaliser's soft output, ln $$\ln\left( \sum_{k=1}^n \exp(\lambda_k) \right),$$

may advantageously be computed using the $$\ln\left(\sum_{k=1}^{n} \exp(\lambda_k)\right) = J(\lambda_n, J(\lambda_{n-1}, \cdots J(\lambda_3, J(\lambda_2, \lambda_1)) \cdots ))$$

$$J(\lambda_1, \lambda_2) \approx \max(\lambda_1, \lambda_2) + f_c(|\lambda_1 - \lambda_2|)$$

Here $f_c(x)$ is a logarithmic correction function that can be tabulated in a look-up table such as that given in Table 1 below.

TABLE 1

| x | $f_c(x)$ |
|---|---|
| x > 3.7 | 0.0 |
| 3.7 ≥ x > 2.25 | 0.05 |
| 2.25 ≥ x > 1.5 | 0.15 |
| 1.5 ≥ x > 1.05 | 0.25 |
| 1.05 ≥ x > 0.7 | 0.35 |
| 0.7 ≥ x > 0.43 | 0.45 |
| 0.43 ≥ x > 0.2 | 0.55 |
| 0.2 ≥ x | 0.65 |

In this way the computational complexity of technique may be reduced by replacing the use of logarithmic and exponential functions in the likelihood calculation with a simple look-up table and "max( )" function.

To further reduce the computation complexity, the equalizer coefficients, that is terms $F_n$ and $K_n^i$ defined in equations (10) and (13) respectively, may be set to be non-varying with time n. An average of the covariance matrix $$\bar{R}_{XX} = \frac{1}{P}\sum_{n=1}^{P} cov(X_n, X_n) \text{ and } \overline{cov(x_n^i, x_n^j)} = \frac{1}{P}\sum_{n=1}^{P} cov(x_n^i, x_n^j)$$

over a received symbol packet of P symbols, may instead be used to compute the coefficients in Equation (10) and (13). These time invariant equalizer coefficients F and $K^i$ may then be used to facilitate a reduced complexity computation of the transmitted symbol $\hat{x}_n^i$ in Equation (12).

Figure 3:
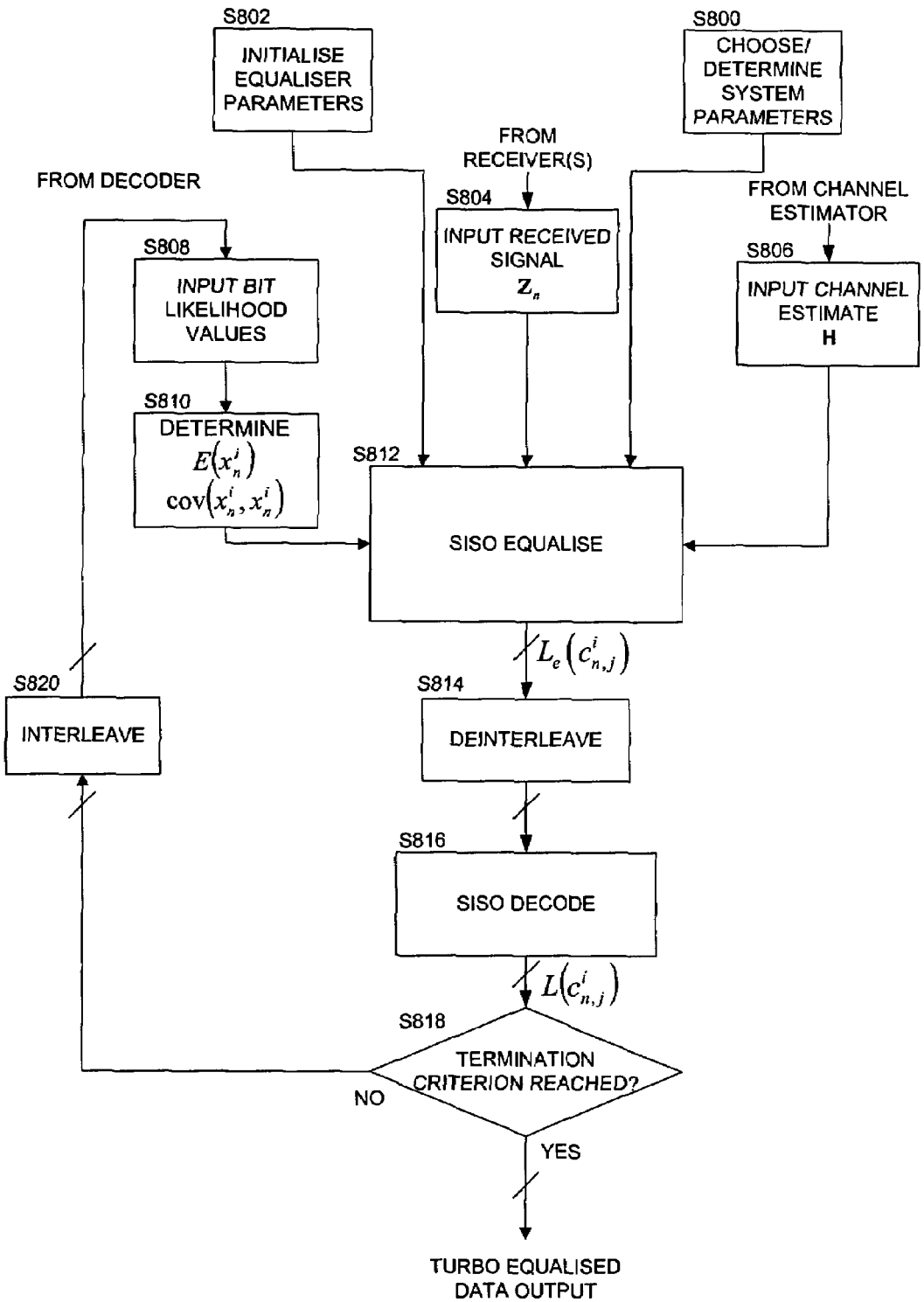
FIG. 3 shows a flow diagram of a MMSE MIMO turbo equalisation procedure according to an embodiment of the present invention.

FIG. 3 shows a flow diagram of an implementation the above-described turbo equalisation procedure. System parameters are determined or chosen at step S800 including, for example, the symbol alphabet S and the number of filter coefficients N=N1+N2 (N1 and N2 are typically chosen such that N1=N2=L). Strictly speaking, however, this is not part of the actual equalisation procedure.

At step S802 equaliser parameters are initialised, for example by setting $E(x_n^i)=0$, $cov(x_n^i,x_n^i)=\delta_{x,i}^2$, and $L(c_{n,j}^i)=0$ (a log likelihood ratio L(.) of 0 implying c=+1 and c=−1 are equiprobable), then at step S804 a block of received signal $Z_n$ is input from one or more receivers and, at step S806, a estimated CIR matrix H is input from a channel estimator.

At step S808 the mean $E(x_n^i)$ and covariance $cov(x_n^i,x_n^i)$ of the transmitted symbols are obtained, according (after the first iteration) to the a priori information of the transmitted bits from the SISO decoder $L(c_{n,j}^i)$,i=1, . . . $n_t$,j=1, . . . , m (where m is the number of bits per symbol) using equations (16), (17) and (18). Then, at step S812, using the mean $E(x_n^i)$ and covariance $cov(x_n^i,x_n^i)$ values of the transmitted symbols the equalizer coefficients $F_n$ and $K_n^i$ are obtained (using equations (10) and (13) respectively) and the mean of the received signal $E(Z_n)$ is determined using equation (9a). The estimated transmitted signal $\hat{x}_n$ is then given by equation (12), and the "extrinsic" information on the transmitted symbols, $L_e(c_{n,j}^i)$, which will provide a soft input to the SISO decoder from the equaliser, is obtained using equation (19) given the estimated transmitted symbols and the a priori information relating to the transmitted bits.

Deinterleaving is performed at step S814, corresponding to the interleaving performed after encoding and before transmission of the data at the transmitter. Thus the extrinsic information from the equalizer is deinterleaved before passing to the decoder. Then at step S816 the extrinsic information relating to the transmitted bits is used as the a priori knowledge at the decoding stage to provide the decoder's extrinsic information. The deinterleaved signals are decoded in accordance with the encoding used at the transmitter. A check is then made, at step S818, to determine whether a termination criterion has been reached and, if it has not, the procedure loops back to reinterleave the extrinsic information from the decoder and to pass this back to the equalizer via step S808. The termination criterion may comprise, for example, a predetermined number of iterations or a determination of whether the decoder soft output, that indicates the reliability of the decoded data, is more than a threshold value. If the termination criterion has been met the equalized and decoded bits at the final iteration are provided as an output estimate of the transmitted data bits.

Figure 4:
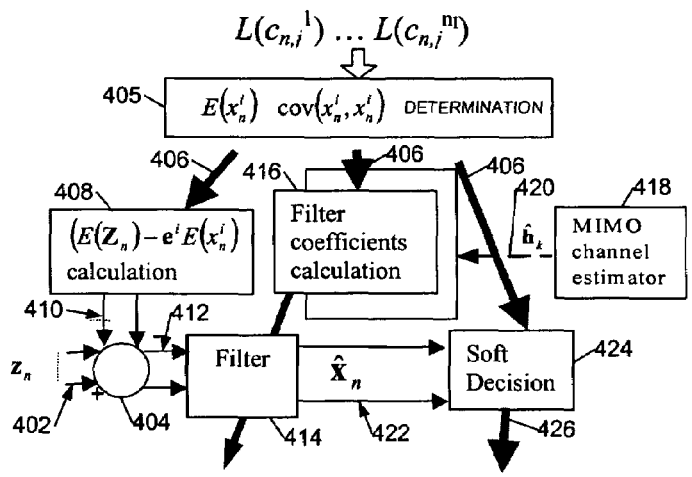
FIG. 4 shows a block diagram of a soft-in-soft-out filter-based MIMO equalizer according to an embodiment of the present invention.

FIG. 4 shows a block diagram of a soft-in-soft-out filter-based MIMO equalizer 400 configured to operate according to the procedure of FIG. 3.

Referring to FIG. 4 the equaliser comprises an input 402 to receive a plurality of received signal blocks from a corresponding plurality of receive antennas, these received signal inputs providing a first set of inputs to a subtractor 404. A second set of inputs to the equaliser 400 comprises a set of soft or likelihood values 406 from a soft-in-soft-out decoder, to provide a priori transmitted bit information to the equaliser. This information is processed by block 405 to determine $E(x_n^i)$ and $cov(x_n^i,x_n^i)$ and these (estimated) mean (or expectation) and covariance values are used by block 408 to perform a calculation $(E(Z_n)-e^i E(x_n^i))$ to determine an expected set of received signal values. This provides a second set of inputs 410 to subtractor 404 for subtraction from the first set of inputs 402 to provide a "compensated" signal 412 to a linear (affine) or transversal filter 414. The soft likelihood values 406 from SISO decoder are used by a filter coefficient calculation block 416 to determine a set of coefficients for filter 414. A MIMO channel estimator 418 provides a channel estimate input 420 to this filter coefficient calculation block 416. The output of filter 414 comprises a set of estimated transmitted signal values 422, one for each transmit antenna, which are in turn provided to a soft decision block 424 which provides a corresponding plurality of outputs 426 comprising soft (or likelihood) transmitted bit values which are suitable for providing a soft input to the SISO decoder.

Figure 5:
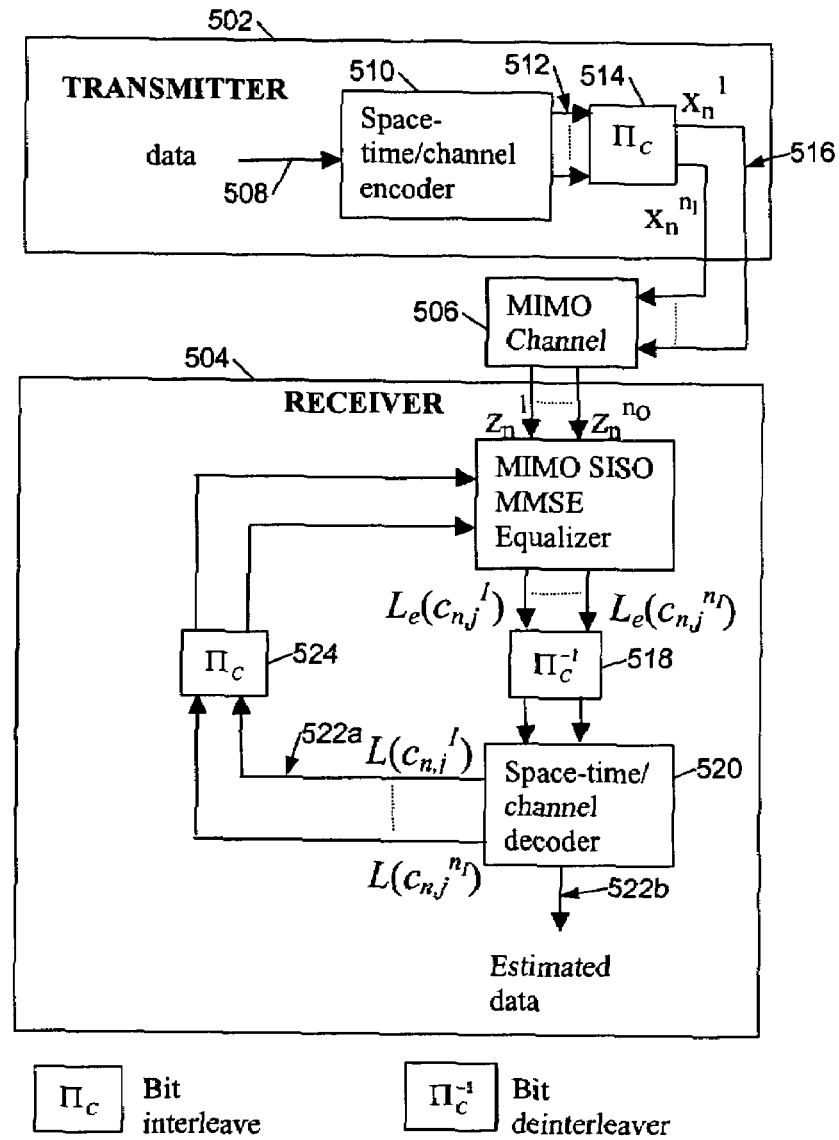
FIG. 5 shows a MIMO communications system including a receiver employing the MIMO equaliser of FIG. 4.

FIG. 5 shows a MIMO communication system 500 including a MIMO transmitter 502 and a MIMO receiver 504 communicating via a MIMO channel 506. The receiver 504 incorporates a MIMO SISO (MMSE) equaliser 400, for example as described with reference to FIG. 4. The transmitter 502 has a data input 508 providing an input to a space-time and/or channel encoder 510 (in other embodiments other coding schemes may be employed). The encoder 510 provides a plurality of outputs 512 to an interleaver 514 which, in turn, provides signals to a plurality of rf output stages and thence to a corresponding plurality of transmit antennas. In FIG. 5, for clarity these rf stages and transmit antennas are not shown explicitly but instead a plurality of outputs 516 comprising the plurality of transmitted signals is shown providing an output from interleaver 514 which, via MIMO channel 506, provides a (different) plurality of inputs to receiver 504. It will be recognised that the communication system of FIG. 5 employs a single transmitter to provide a plurality of transmit output streams, either for redundancy or increased bit rate. The transmissions from the plurality of transmit antennas may, for example, share the frequency or overlap in frequency and/or overlap in time. This is different to a communication system employing a plurality of users with frequency and/or time domain controlled access in which, generally speaking, it is preferred to assign different frequencies and/or time slots to different uses.

Continuing to refer to FIG. 5, a plurality of receive antennas coupled to a corresponding plurality of rf receiver front ends (not shown for clarity in FIG. 5) provides a plurality of inputs to MIMO SISO MMSE equaliser 400. The soft output 426 from the equaliser 400 are deinterleaved by a deinterleaver 518 and then provided to a space-time/channel decoder 520. The decoder accepts a plurality of inputs, one for each signal stream from a transmit antenna, and provides a corresponding plurality of outputs 522a, b which are either provided to a bit interleaver 524 and returned to equaliser 400 for a further equalisation-decoding iteration or, if a termination criterion has been reached, output as estimated data. It will be appreciated that equaliser needs complete transmitted symbols from decoder 520, that is where, for example, error check bit such as parity bits have been included transmit symbols including these parity bits should be provided to the equaliser. The MIMO channel estimator 418 of FIG. 4 (not shown in FIG. 5) may receive a set of inputs from bit interleaver 524 and output an estimate of H to equaliser 400.

Figure 6:
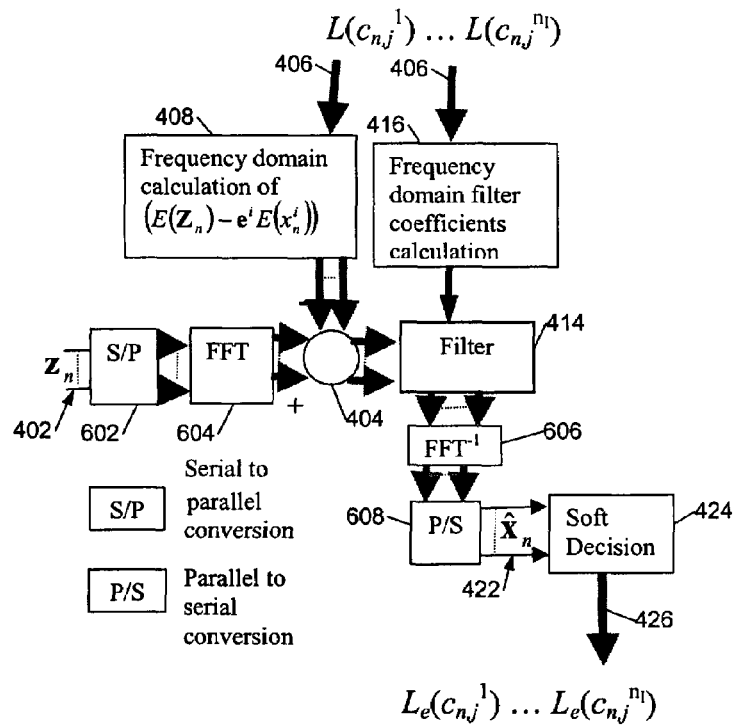
FIG. 6 shows a block diagram of a frequency domain soft-in-soft-out filter-based MIMO equalizer according to a further embodiment of the present invention.

Referring now to FIG. 6 this shows a block diagram of a soft-in-soft-out filter-based MIMO equalizer 600 configured to operate in the frequency domain. The main elements of equaliser 600 are similar to those of FIG. 4 and are indicated by like reference numerals. The main differences are that calculation blocks 408 and 416 perform frequency domain calculations and that subtractor 404 and filter 414 operate in the frequency rather than the time domain (though, for simplicity of comparison, the same reference numerals have been employed and the channel estimator has been omitted). Thus the main additions are a serial-to-parallel conversion block 602 and fast Fourier transform (FFT) block 604 prior to subtractor 404 and filter 414, and an inverse fast Fourier transform (FFT$^{-1}$) 606 and a parallel-to-serial conversion block 608 following filter 414. These blocks convert the received signals from the time to frequency domain for processing and back to the time domain after processing.

Background information relating to SISO equalisation in the frequency domain can be found in Tuichler, M., Hagenauer, J., "Turbo equalization' using frequency domain equalizers" in: *Proc. Allerton Conference*, Monticello, Ill., USA, October 2000, to which reference may be made. It will be appreciated, however, that this reference only discloses frequency domain turbo equalisation for a single-transmit-antenna-single-receive-antenna system. Other background information can be found in M. V. Clark, "Adaptive Frequency-Domain Equalization and Diversity Combining for Broadband Wireless Communications", IEEE JSAC, vol. 16, no. 8, pp. 1385-1395, October 1998, and D. Falconer, S. L. Ariyavistakul, A. Benyamin-Seeyar, B. Eidson, "Frequency Domain Equalization for Single-Carrier Broadband Wireless Systems", IEEE Communications Magazine, pp. 58-66, April 2002.

Continuing to refer to the example of a frequency domain implementation of the equaliser shown in FIG. 6, the signals from the receive antenna(s) are transformed into the frequency domain by Fast Fourier Transform (FFT) on a per FTT block/packet basis and the spectra of the received signals are equalized by multiplying the spectrum of each branch with the frequency domain coefficients of the equalizer. Frequency domain equalization again reduces the computational complexity of the equalization task by processing an entire FFT block/packet of received symbols at once in the frequency domain instead of symbol-by-symbol in the time domain although it will be appreciated that because of this the equalizer coefficients are time-invariant per FFT block. Furthermore a cyclic extension (for example, prefix) should be added to the transmitted symbol block/packet before transmission (to provide an integral number of cycles within the FFT interval) although this is discarded at the receiver. The frequency domain implementation of the turbo equaliser is suitable for both time and/or frequency domain coded data, and may be used, for example, with MIMO OFDM transmissions.

Figure 7:
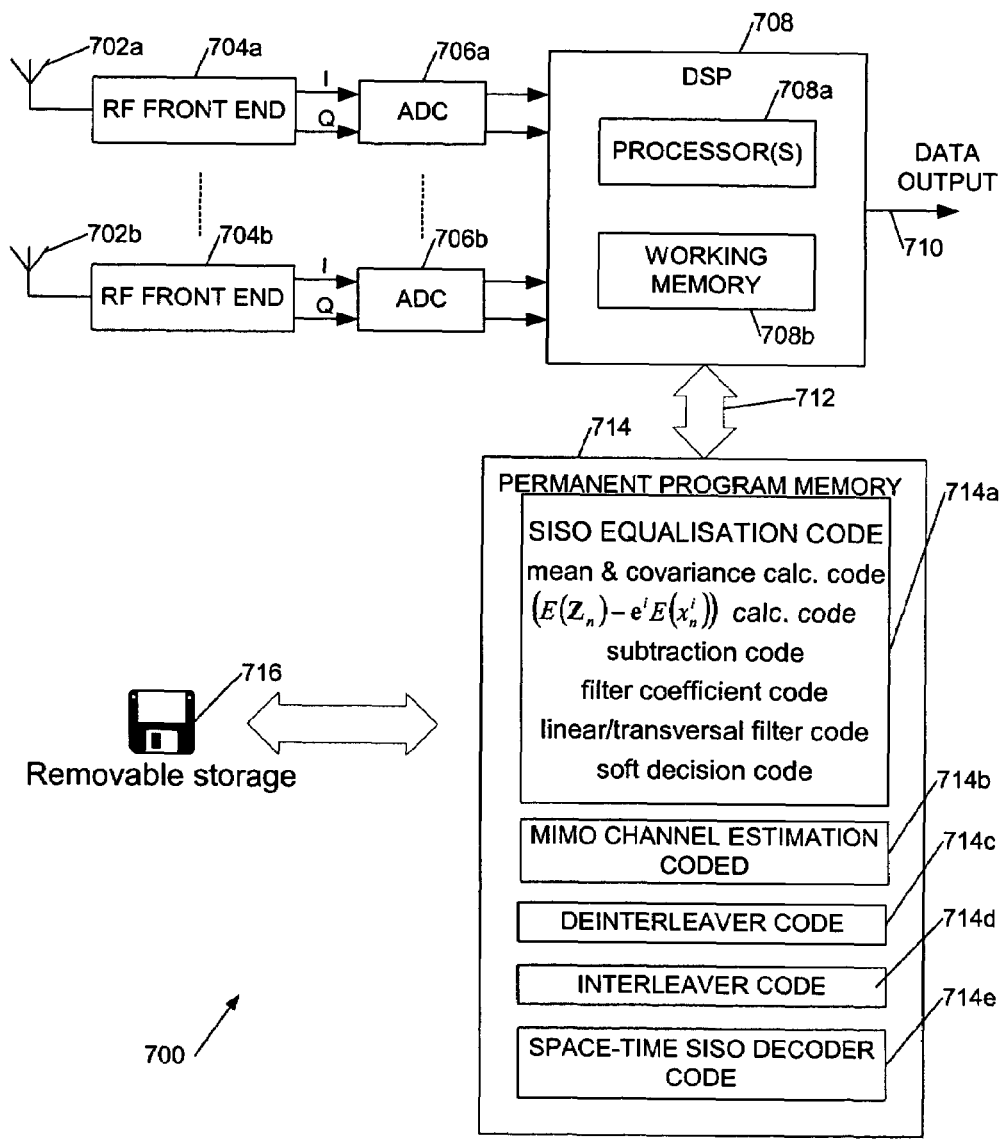
FIG. 7 shows a receiver incorporating an equaliser configured to operate in accordance with an embodiment of an aspect of the present invention.

Referring now to FIG. 7, this shows an embodiment of a receiver 700 incorporating a equaliser configured to operate as described above, in particular to operate as described with reference to FIGS. 3 and 4.

Receiver 700 comprises one or more receive antennas 702a, b (of which two are shown in the illustrated embodiment) each coupled to a respective rf front end 704a, b, for example similar to the rf front end of FIG. 2a, and thence to a respective analogue-to-digital converter 706a,b and to a digital signal processor (DSP) 708. DSP 708 will typically include one or more processors 708a (for example, for a parallel implementation of filter 414) and some working memory 708b. The DSP 708 has a data output 710 and an address, data and control bus 712 to couple the DSP to permanent program memory 714 such as flash RAM or ROM. Permanent program memory 714 stores code and optionally data structures or data structure definitions for DSP 708.

As illustrated program memory 714 includes SISO equalisation code 714a comprising ($E(Z_n)-e^i E(x_n^i)$) calculation code, subtraction code, filter coefficient calculation code, linear (transversal) filter code and soft decision output code to, when running on DSP 708, implement the corresponding functions as described in detail above. Program memory 714 also includes MIMO channel estimation code 714b to provide a MIMO CIR estimate H, de-interleaver code 714c, interleaver code 714d, and space-time (or other) SISO decoder code 714e. Examples of suitable code 714e are well known to those skilled in the art. Optionally the code in permanent program memory 714 may be provided on a carrier such as an optical or electrical signal carrier or, as illustrated in FIG. 7, a floppy disk 716. The data output 710 from DSP 708 is provided to further data processing elements of receiver 700 (not shown in FIG. 7) as desired. These may include a block error decoder such as a Reed-Solomon decoder (although this could be part of the turbo decoder), and a baseband data processor for implementing higher level protocols.

The receiver front-end will generally be implemented in hardware whilst the receiver processing will usually be implemented at least partially in software although one or more ASICs and/or FPGAs may also be employed. The skilled person will recognise that all the functions of the receiver could be performed in hardware and that the exact point at which the signal is digitised in a software radio will generally depend upon a cost/complexity/power consumption trade-off.

Figure 8:
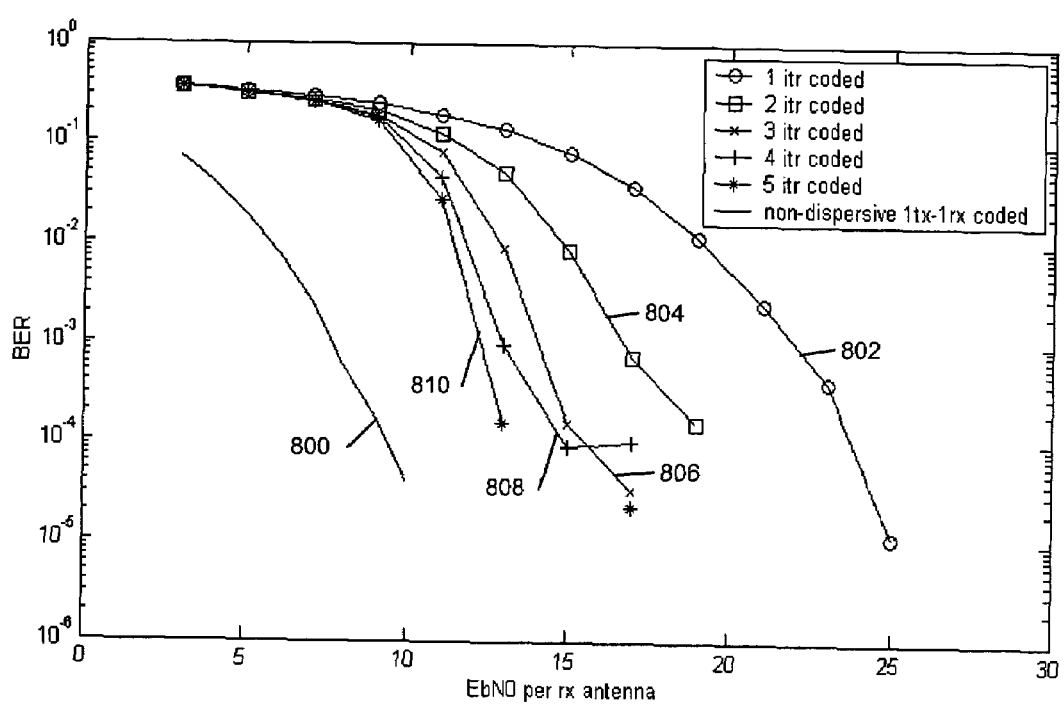
FIG. 8 shows bit error rate performance against received signal to noise ratio for a turbo-equalizer and according to an embodiment of the present invention, for varying numbers of equalization-decode iterations.

FIG. 8 shows bit error rate (BER) performance against received signal to noise ratio ($E_b/N_0$) for an embodiment of the turbo-equalizer, for varying numbers of equalization-decode iterations. In FIG. 8 curve 800 shows a theoretical result for a single transmit single receive antenna system with a non dispersive channel and the remaining curves show the 8PSK performance of an MMSE-based MIMO SISO turbo-equalizer for a two-transmit-antenna transmitter, two-receive-antenna receiver MIMO system with a dispersive channel of $$h_0^{1,1} = 0.707, h_1^{1,1} = 0.707, h_0^{1,2} = 0.707, h_1^{1,2} = 0.707,$$
$$h_0^{2,1} = 0.707, h_1^{2,1} = 0.707, h_0^{2,2} = 0.9579, h_1^{2,2} = 0.2874.$$

The system utilizes half-rate (5,7) convolutional coding and the equalizer parameters are N1=9 and N2=5. More specifically curves 802, 804, 806, 808 and 810 show, respectively, curves for one, two, three, four and five turbo equalisation iterations. It can be seen that performance increases significantly with the number of iterations and approaches that of a non-dispersive channel, although with large numbers of iterations the incremental performance increase is reduced. The reduction in incremental increase can be used to determine a termination criterion for a potential application, for example limiting to 2, 5 or 10 iterations depending, for example, upon speed-processing power trade-offs.

Applications of the invention have been mainly described in the context of a MIMO system with time domain coding but embodiments of the invention are also useful in frequency domain coded systems such as MIMO-OFDM (Orthogonal Frequency Division Multiplexed) systems. For example the invention may be employed with the European Hiperlan/2 or US IEEE 802.11a standards for 54 Mbps wireless networks. Embodiments of the invention may also be employed in non-wireless applications such as magnetic or optical disk drive read head circuitry where, for example, multiple layers of a disk in effect act as multiple transmitters, one or more heads receiving read data influenced by "transmitted" signals from more than one layer.

No doubt many other effective alternatives will occur to the skilled person. It will be understood that the invention is not limited to the described embodiments and encompasses modifications apparent to those skilled in the art lying within the spirit and scope of the claims appended hereto.

I claim:

1. A soft-in-soft-out (SISO) equaliser for use in a receiver of a communications system employing a plurality of transmit antennas, the equaliser comprising:
at least one received signal input for inputting a received signal;
a plurality of likelihood value inputs, one for each transmit antenna, for inputting a plurality of decoded signal likelihood values from a SISO decoder;
a processor configured to determine from said plurality of signal likelihood values an estimated mean and covariance value for a signal from each of said transmit antennas;
an expected signal determiner coupled to said processor to determine an expected received signal value using said mean values;
a subtractor coupled to said received signal input to subtract said expected received signal value from said received signal to provide a compensated signal;
a filter coupled to said subtractor to filter said compensated signal to provide a plurality of estimated transmitted signal values, one for each said transmit antenna;
a filter coefficient determiner coupled to said processor to determine coefficients of said filter using said covariance values; and
an output stage coupled to said filter to output a plurality of transmitted signal likelihood values, one for each said transmit antenna, for input to said SISO decoder.

2. A SISO equaliser as claimed in claim 1 further comprising an adjuster to adjust said expected received signal value by an amount dependent upon said estimated mean values.

3. A SISO equaliser as claimed in claim 2 further comprising a filter gain controller configured to control the gain of said filter dependent upon said estimated covariance values.

4. A SISO equaliser as claimed in claim 1 wherein said filter comprises a linear or transversal filter.

5. A SISO equaliser as claimed in claim 1 wherein said filter coefficient determiner is configured to determine said filter coefficients according to a mean square error cost function.

6. A SISO equaliser as claimed in claim 1 wherein said filter coefficient determiner is configured to determine said filter coefficients responsive to covariance values of estimated transmitted signal values derived from said signal likelihood values from said SISO decoder.

7. A SISO equaliser as claimed in claim 1 configured to utilise substantially constant filter coefficients for equalising a block or packet of received data symbols.

8. A SISO equaliser as claimed in claim 7 wherein said filter coefficient determiner is configured to operate in the frequency domain, said equaliser further comprising Fourier transform means prior to said filter and inverse Fourier transform means following said filter.

9. A SISO equaliser as claimed in claim 1 for use in a receiver for receiving data from a transmitter configured to transmit data from a plurality of transmit antennas simultaneously, the equaliser comprising a plurality of received signal inputs each coupled to said subtractor for inputting a plurality of received signals one from each of a plurality of receive antennas, and wherein said subtractor is configured to subtract a plurality of expected signal values relating to said plurality of receive antennas from said plurality of received signals to provide compensated signals to said filter.

10. A receiver incorporating a soft-in-soft-out (SISO) equaliser for use in a receiver of a communications system employing a plurality of transmit antennas, the equaliser comprising:
at least one received signal input for inputting a received signal;
a plurality of likelihood value inputs, one for each transmit antenna, for inputting a plurality of decoded signal likelihood values from a SISO decoder;
a processor configured to determine from said plurality of signal likelihood values an estimated mean and covariance value for a signal from each of said transmit antennas;
an expected signal determiner coupled to said processor to determine an expected received signal value using said mean values;

a subtractor coupled to said received signal input to subtract said expected received signal value from said received signal to provide a compensated signal;

a filter coupled to said subtractor to filter said compensated signal to provide a plurality of estimated transmitted signal values, one for each said transmit antenna;

a filter coefficient determiner coupled to said processor to determine coefficients of said filter using said covariance values; and an output stage coupled to said filter to output a plurality of transmitted signal likelihood values, one for each said transmit antenna, for input to said SISO decoder.

11. A method of equalising received data in a communications system employing a receiver with at least one receive antenna and a transmitter with a plurality of transmit antennas, the method comprising:

inputting at least one received signal from said at least one receive antenna;

inputting a plurality of decoded signal likelihood values, one for each transmit antenna, from a SISO decoder;

determining from said plurality of signal likelihood values an estimated mean and covariance value for a signal from each of said transmit antennas;

determining an expected received signal value using said mean values;

subtracting said expected received signal value from said received signal to provide a compensated signal;

determining coefficients for a filter using said covariance values;

filtering said compensated signal in accordance with said coefficients to provide a plurality of estimated transmitted signal values, one for each said transmit antenna; and outputting a plurality of transmitted signal likelihood values, one for each said transmit antenna, derived from said estimated transmitted signal values, for input to said SISO decoder.

12. A method as claimed in claim 11 further comprising adjusting said expected received signal value by an amount dependent upon said estimated mean values.

13. A method as claimed in claim 12 further comprising controlling the gain of said filter dependent upon said estimated covariance values.

14. A method as claimed in claim 11 wherein said filtering comprises linear or transversal filtering.

15. A method as claimed in claim 11 wherein said determining substantially minimises a mean square estimated transmitted signal error cost function.

16. A method as claimed in claim 11 wherein said determining is responsive to covariance values of estimated transmitted signal values derived from said signal likelihood values from said SISO decoder.

17. A method as claimed in claim 11 further comprising maintaining said filter coefficients substantially constant over a block or packet of received data symbols.

18. A method as claimed in claim 11 wherein said filtering is performed in the frequency domain.

19. A method as claimed in claim 18 further comprising transforming said received signal into the frequency domain prior to said filtering and transforming the result of said filtering into the time domain following said filtering.

20. A method as claimed in claim 11 for use in a receiver receiving data from a transmitter configured to transmit data from a plurality of transmit antennas simultaneously, the method comprising inputting a plurality of received signals from a plurality of receive antennas, and wherein said subtracting comprises subtracting a plurality of expected signal values relating to said plurality of receive antennas from said plurality of received signals to provide compensated signals for said filtering.

21. A method of turbo equalisation comprising iteratively equalising data by the method comprising:

inputting at least one received signal from said at least one receive antenna;

inputting a plurality of decoded signal likelihood values, one for each transmit antenna, from a SISO decoder;

determining from said plurality of signal likelihood values an estimated mean and covariance value for a signal from each of said transmit antennas;

determining an expected received signal value using said mean values;

subtracting said expected received signal value from said received signal to provide a compensated signal;

determining coefficients for a filter using said covariance values;

filtering said compensated signal in accordance with said coefficients to provide a plurality of estimated transmitted signal values, one for each said transmit antenna;

outputting a plurality of transmitted signal likelihood values, one for each said transmit antenna, derived from said estimated transmitted signal values, for input to said SISO decoder; and decoding said transmitted signal likelihood values from said equalising to provide decoded signal likelihood values for said equalising.

22. A method of equalising data in a receiver of a communications system with a plurality $n_I$ of transmit antennas the method comprising:

inputting a received signal vector $Z_n$ comprising a block of received signal data at an index n;

inputting from a SISO decoder a set of bit likelihood values $L(c_{n,j}^i)$, i=1 to $n_I$, j=1 to m where $c_{n,j}^i$, denotes a portion of an m-bit codeword symbol at an index n;

determining expectation $E(x_n^i)$ and covariance $cov(x_n^i, x_n^i)$ values for estimated transmitted signal values $x_n^i$ using the values $L(c_{n,j}^i)$ where $x_n^i$ denotes an estimated value of a signal transmitted from a transmit antenna i at an index n;

determining an updated estimated transmitted signal value $\hat{x}_n^i$ at index n for each transmit antenna i using $\hat{x}_n^i = K_n^i f_n^{i^H} [Z_n - (E(Z_n) - e^i E(x_n^i))]$ where $E(Z_n) = HE(X_n)$ and H is a channel impulse response matrix and $E(X_n)$ is an expectation value of an estimated transmitted signal vector $X_n$ at index n derived from values $E(x_n^i)$, where $e^i$ is the ith column of a matrix S and $S = H[0_{n_I \times (N2+L-1)n_I} I_{n_I \times n_I} 0_{n_I \times N1 n_I}]^H$ where matrix $I_{i \times i}$ is an i×i identity matrix and $0_{i \times j}$ is a matrix in which each element is substantially zero, $f_n^i$ is the ith column of a filter matrix $F_n$ and $F_n$ is derived from $cov(x_n, x_n)$, and where $K_n^i$ is a scalar filter gain; and outputting equalised likelihood values $L_e(c_{n,j}^i)$ derived from values $\hat{x}_n^i$.

23. A method of equalising data as claimed in claim 22 further comprising decoding said values $L_e(c_{n,j}^i)$ to provide said values $L(c_{n,j}^i)$.

24. A method as claimed in claim 23 comprising iteratively equalising and decoding to determine values for $L_e(c_{n,j}^i)$ and $L(c_{n,j}^i)$ until a termination criterion is reached.

25. A method as claimed in claim 24 further comprising deinterleaving said $L_e(c_{n,j}^i)$ values and interleaving said $L(c_{n,j}^i)$ values.

26. A method as claimed in claim 22 wherein $F_n$ is derived from $[R_{WW}+HR_{XX}H^H]^{-1}S$ where $R_{XX}=\text{cov}(x_n,x_n)$ and $R_{WW}$ is a noise covariance matrix.

27. A method as claimed in claim 22 wherein n indexes time.

28. A method as claimed in claim 22 wherein n indexes frequency.

29. Processor control code to, when running, implement a method of equalising received data in a communications system employing a receiver with at least one receive antenna and a transmitter with a plurality of transmit antennas, the method comprising:
   inputting at least one received signal from said at least one receive antenna;
   inputting a plurality of decoded signal likelihood values, one for each transmit antenna, from a SISO decoder;
   determining from said plurality of signal likelihood values an estimated mean and covariance value for a signal from each of said transmit antennas;
   determining an expected received signal value using said mean values;
   subtracting said expected received signal value from said received signal to provide a compensated signal;
   determining coefficients for a filter using said covariance values;
   filtering said compensated signal in accordance with said coefficients to provide a plurality of estimated transmitted signal values, one for each said transmit antenna; and
   outputting a plurality of transmitted signal likelihood values, one for each said transmit antenna, derived from said estimated transmitted signal values, for input to said SISO decoder.

30. A carrier carrying the processor control code of claim 29.

31. An equaliser configured to operate in accordance with a method of equalising received data in a communications system employing a receiver with at least one receive antenna and a transmitter with a plurality of transmit antennas, the method comprising:
   inputting at least one received signal from said at least one receive antenna;
   inputting a plurality of decoded signal likelihood values, one for each transmit antenna, from a SISO decoder;
   determining from said plurality of signal likelihood values an estimated mean and covariance value for a signal from each of said transmit antennas;
   determining an expected received signal value using said mean values;
   subtracting said expected received signal value from said received signal to provide a compensated signal;
   determining coefficients for a filter using said covariance values;
   filtering said compensated signal in accordance with said coefficients to provide a plurality of estimated transmitted signal values, one for each said transmit antenna; and
   outputting a plurality of transmitted signal likelihood values, one for each said transmit antenna, derived from said estimated transmitted signal values, for input to said SISO decoder.

32. A data communications receiver including an equaliser configured to operate in accordance with a method of equalising received data in a communications system employing a receiver with at least one receive antenna and a transmitter with a plurality of transmit antennas, the method comprising:
   inputting at least one received signal from said at least one receive antenna;
   inputting a plurality of decoded signal likelihood values, one for each transmit antenna, from a SISO decoder;
   determining from said plurality of signal likelihood values an estimated mean and covariance value for a signal from each of said transmit antennas;
   determining an expected received signal value using said mean values;
   subtracting said expected received signal value from said received signal to provide a compensated signal;
   determining coefficients for a filter using said covariance values;
   filtering said compensated signal in accordance with said coefficients to provide a plurality of estimated transmitted signal values, one for each said transmit antenna; and
   outputting a plurality of transmitted signal likelihood values, one for each said transmit antenna, derived from said estimated transmitted signal values, for input to said SISO decoder.

33. Processor control code to, when running, implement a method of equalising data in a receiver of a communications system with a plurality n, of transmit antennas the method comprising:
   inputting a received signal vector $Z_n$ comprising a block of received signal data at an index n;
   inputting from a SISO decoder a set of bit likelihood values $L(c_{n,j}^i)$, i=1 to $n_I$, j=1 to m where $c_{n,j}^i$, denotes a portion of an m-bit codeword symbol at an index n;
   determining expectation $E(x_n^i)$ and covariance $\text{cov}(x_n^i, x_n^i)$ values for estimated transmitted signal values $x_n^i$ using the values $L(c_{n,j}^i)$ where $x_n^i$ denotes an estimated value of a signal transmitted from a transmit antenna i at an index n;
   determining an updated estimated transmitted signal value $\hat{x}_n^i$ at index n for each transmit antenna i using $\hat{x}_n^i = K_n^i f_n^{iH}[Z_n-(E(Z_n)-e^iE(x_n^i))]$ where $E(Z_n)=HE(X_n)$ and H is a channel impulse response matrix and $E(X_n)$ is an expectation value of an estimated transmitted signal vector $X_n$ at index n derived from values $E(x_n^i)$, where $e^i$ is the ith column of a matrix S and $S=H[0_{n_I\times(N2+L-1)n_I} \; I_{n_I\times m_I} \; 0_{n_I\times N1n_I}]^H$ where matrix $I_{i\times i}$ is an i×i identity matrix and $0_{i\times j}$ is a matrix in which each element is substantially zero, $f_n^i$ is the ith column of a filter matrix $F_n$ and $F_n$ is derived from $\text{cov}(x_n,x_n)$, and where $K_n^i$ is a scalar filter gain; and
   outputting equalised likelihood values $L_e(C_{n,j}^i)$ derived from values $\hat{x}_n^i$.

34. A carrier carrying the processor control code of claim 33.

35. An equaliser configured to operate in accordance with a method of equalising data in a receiver of a communications system with a plurality $n_I$ of transmit antennas the method comprising:
   inputting a received signal vector $Z_n$ comprising a block of received signal data at an index n;
   inputting from a SISO decoder a set of bit likelihood values $L(c_{n,j}^i)$, i=1 to $n_I$, j=1 to m where $c_{n,j}^i$, denotes a portion of an m-bit codeword symbol at an index n;
   determining expectation $E(x_n^i)$ and covariance $\text{cov}(x_n^i, x_n^i)$ values for estimated transmitted signal values $x_n^i$ using the values $L(c_{n,j}^i)$ where $x_n^i$ denotes an estimated value of a signal transmitted from a transmit antenna i at an index n;
   determining an updated estimated transmitted signal value $\hat{x}_n^i$ at index n for each transmit antenna i using $\hat{x}_n^i = K_n^i f_n^{i^H}[Z_n - (E(Z_n) - e^i E(x_n^i))]$ where $E(Z_n) = HE(X_n)$ and H is a channel impulse response matrix and $E(X_n)$ is an expectation value of an estimated transmitted signal vector $X_n$ at index n derived from values $E(x_n^i)$ where $e^i$ is the ith column of a matrix S and $S = H[0_{n_I \times (N2+L-1)n_I} \ I_{n_I \times n_I} \ 0_{n_I \times N1 n_I}]^H$ where matrix $I_{i \times i}$ is an i×i identity matrix and $0_{i \times j}$ is a matrix in which each element is substantially zero, $f_n^i$ is the ith column of a filter matrix $F_n$ and $F_n$ is derived from $cov(x_n, x_n)$, and where $K_n^i$ is a scalar filter gain; and outputting equalised likelihood values $L_e(c_{n,j}^i)$ derived from values $\hat{x}_n^i$.

36. A data communications receiver including an equaliser configured to operate in accordance with a method of equalising data in a receiver of a communications system with a plurality $n_I$ of transmit antennas the method comprising:

inputting a received signal vector $Z_n$ comprising a block of received signal data at an index n;

inputting from a SISO decoder a set of bit likelihood values $L(c_{n,j}^i)$, i=1 to $n_I$, j=1 to m where $c_{n,j}^i$ denotes a portion of an m-bit codeword symbol at an index n;

determining expectation $E(x_n^i)$ and covariance $cov(x_n^i, x_n^i)$ values for estimated transmitted signal values $x_n^i$ using the values $L(c_{n,j}^i)$, where $x_n^i$ denotes an estimated value of a signal transmitted from a transmit antenna i at an index n;

determining an updated estimated transmitted signal value $\hat{x}_n^i$ at index n for each transmit antenna i using $\hat{x}^{ni} = K_n^i f_n^{i^H}[Z_n - (E(Z_n) - e^i E(x_n^i))]$ where $E(Z_n) = HE(X_n)$ and H is a channel impulse response matrix and $E(X_n)$ is an expectation value of an estimated transmitted signal vector $X_n$ at index n derived from values $E(x_n^i)$, where $e^i$ is the ith column of a matrix S and $S = H[0_{n_I \times (N2+L-1)n_I} \ I_{n_I \times n_I} \ 0_{n_I \times N1 n_I}]^H$ where matrix $I_{i \times i}$ is an i×i identity matrix and $0_{i \times j}$ is a matrix in which each element is substantially zero, $f_n^i$ is the ith column of a filter matrix $F_n$ and $F_n$ is derived from $cov(x_n, x_n)$, and where $K_n^i$ is a scalar filter gain; and outputting equalised likelihood values $L_e(c_{n,j}^i)$ derived from values $\hat{x}_n^i$.

\* \* \* \* \*